US010294982B2

(12) United States Patent
Gabrys et al.

(10) Patent No.: US 10,294,982 B2
(45) Date of Patent: May 21, 2019

(54) SYSTEMS, METHODS, AND APPARATUS FOR SUPPORTED SHAFTS

(71) Applicant: The Boeing Company, Chicago, IL (US)

(72) Inventors: Jonathan W. Gabrys, Downingtown, PA (US); Dinesh J. Trivedi, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 15/370,956

(22) Filed: Dec. 6, 2016

(65) Prior Publication Data

US 2017/0082139 A1 Mar. 23, 2017

Related U.S. Application Data

(63) Continuation-in-part of application No. 14/229,608, filed on Mar. 28, 2014, now abandoned.

(51) Int. Cl.
*F16C 3/00* (2006.01)
*F16C 3/02* (2006.01)
(Continued)

(52) U.S. Cl.
CPC ............. *F16C 3/02* (2013.01); *B33Y 80/00* (2014.12); *F16C 3/023* (2013.01);
(Continued)

(58) Field of Classification Search
CPC ........ F16C 3/02; F16C 3/023; F16C 2326/06; F16C 2226/30; B33Y 80/00; B29L 2031/75; Y10T 29/49881; Y10T 156/10
(Continued)

(56) References Cited

U.S. PATENT DOCUMENTS 2,751,765 A 6/1956 Rowland et al.
2,929,408 A 3/1960 Weatherwax et al.
(Continued)

FOREIGN PATENT DOCUMENTS

CN 202001482 U 10/2011
DE 3017336 A1 11/1981
GB 2149061 A 6/1985

OTHER PUBLICATIONS

"The University of Alabama, Center for Academic Success excerpt of Jun. 6, 2010", Retrieved from the internet May 18, 2016, http://web.archive.org/web/2100212121800/http:www.ctl.ua.edu/math103.
(Continued)

*Primary Examiner* — Greg Binda
(74) *Attorney, Agent, or Firm* — Kwan & Olynick LLP

(57) ABSTRACT

Systems, methods, and apparatus are disclosed for transferring a rotational force. Apparatus include a shaft member that has a first end configured to receive a rotational force from a first mechanical component, and configured to receive a torsional load in response to receiving the rotational force. The shaft member also includes a second end configured to provide the rotational force to a second mechanical component. Apparatus also include a support member that includes a plurality of lobes coupled to the shaft member and configured to transmit the torsional load of the shaft member, where the plurality of lobes is coupled to each other along a central coupling and extend radially from the central coupling, where the plurality of lobes has a spiral geometry along a length of the support member such that an orientation of the plurality of lobes rotates along the length of the support member.

19 Claims, 7 Drawing Sheets

(51) Int. Cl.
*B33Y 80/00* (2015.01)
*B29L 31/00* (2006.01)

(52) U.S. Cl.
CPC ....... *B29L 2031/75* (2013.01); *F16C 2226/30* (2013.01); *F16C 2326/06* (2013.01); *Y10T 29/49881* (2015.01); *Y10T 156/10* (2015.01)

(58) Field of Classification Search
USPC .................. 464/181, 183; 116/273; 248/314; 156/60
See application file for complete search history.

(56) References Cited

U.S. PATENT DOCUMENTS

| | | |
|---|---|---|
| 3,069,873 A | 12/1962 | Whitlock et al. |
| 3,099,141 A | 7/1963 | Garten et al. |
| 3,464,450 A * | 9/1969 | Francesco ........... B29C 47/0028 |
| 4,014,184 A | 3/1977 | Stark |
| 5,902,186 A | 5/1999 | Gaukel |
| 7,871,033 B2 | 1/2011 | Karem et al. |
| 9,052,039 B2 * | 6/2015 | Mettee, II ........... B29C 47/0028 |
| 2007/0089820 A1 | 4/2007 | Gabrys et al. |
| 2013/0079166 A1 | 3/2013 | Wang et al. |
| 2015/0275959 A1 | 10/2015 | Gabrys |

OTHER PUBLICATIONS

"United Kingdom Application Serial No. 1505143.6, Office Action dated Sep. 9, 2015", 6 pages.

\* cited by examiner

SYSTEMS, METHODS, AND APPARATUS FOR SUPPORTED SHAFTS

CROSS-REFERENCE TO RELATED APPLICATIONS

This application is a continuation-in-part of U.S. patent application Ser. No. 14/229,608, filed on 2014 Mar. 28, now abandoned, which is incorporated herein by reference in its entirety for all purposes.

TECHNICAL FIELD

This disclosure generally relates to vehicles and machinery and, more specifically, to supported shafts which may be used with vehicles and machinery.

BACKGROUND

Vehicles and machinery may use shafts to transfer rotational forces such as torque among components of the vehicles and machinery. For example, a drive shaft may be used to transfer torque and rotation among components of a drive train. Similarly, propeller shafts may be used to transfer torque and rotation to a propeller. Thus, shafts may be incorporated in vehicles such as cars, airplanes, and helicopters to distribute a rotational force which may be generated by a power plant, such as an engine, among various components of the vehicles.

The shaft may receive or experience a torque while transferring the rotational force. In response to receiving the torque, the shaft may deform and may even collapse upon itself if the torque is too great. In such a situation, the shaft may cease to function properly. Conventional shafts typically utilize thicker shafts to prevent such deformation under high torques. Thus, conventional shafts are typically relatively heavy because they use more material to achieve increased torque capabilities. This increased weight results in poor and inefficient performance characteristics due to large inertias associated with the heavier design. Moreover, they are more susceptible to functional failure in the event that the shaft is damaged, which may be the case when ballistic damage occurs.

SUMMARY

Provided are systems, methods and apparatus for manufacturing and using supported shafts to transfer rotational forces among components of vehicles. Apparatus may include a shaft member that may include a first end configured to receive a rotational force from a first mechanical component, where the shaft member is configured to receive a torsional load in response to receiving the rotational force at the first end. The shaft member may also include a second end configured to provide the rotational force to a second mechanical component, an outer surface, and an inner surface, where the inner surface defines an internal volume of the shaft member. Apparatus may also include a support member that is included in the internal volume of the shaft member. The support member includes a plurality of lobes coupled to the shaft member and configured to transmit the torsional load of the shaft member, where the plurality of lobes is coupled to each other along a central coupling and extend radially from the central coupling, where the plurality of lobes has a spiral geometry along a length of the support member such that an orientation of the plurality of lobes rotates along the length of the support member.

In various embodiments, the plurality of lobes comprises three lobes. In some embodiments, the three lobes are symmetric lobes. According to some embodiments, a direction of the spiral geometry is in the direction of the torsional load generated in response to the rotational force. In various embodiments, the central coupling is a rod. In some embodiments, the length of the support member is substantially equal to a length of the shaft member. In various embodiments, the plurality of lobes is mechanically coupled to the inner surface, and each lobe of the plurality of lobes extends radially from the central coupling. In some embodiments, the first end is coupled to a first cap, and the second end is coupled to a second cap. In various embodiments, the first cap and the second cap are configured to seal the internal volume of the shaft member. According to some embodiments, the first cap includes a first flange and a second flange, and the second cap includes a third flange and a fourth flange. In some embodiments, the support member includes one of titanium and a polymer. In various embodiments, the support member is coupled to the shaft member by a bonding process.

Also disclosed are systems for transferring a rotational force. Systems may include a first cap configured to receive the rotational force from a first mechanical component. Systems may also include a shaft member coupled to the first cap, where the shaft member includes a first end configured to receive the rotational force from the first cap mechanically coupled with a first mechanical component, where the shaft member is configured to receive a torsional load in response to receiving the rotational force at the first end. The shaft member may also include a second end opposite to the first end, an outer surface, and an inner surface, wherein the inner surface defines an internal volume of the shaft member. Systems may also include a support member included in the internal volume of the shaft member. The support member may include a plurality of lobes coupled to the shaft member and configured to transmit the torsional load of the shaft member, where the plurality of lobes is coupled to each other along a central coupling and extend radially from the central coupling, where the plurality of lobes has a spiral geometry along a length of the support member such that an orientation of the plurality of lobes rotates along the length of the support member. Systems may also include a second cap coupled to the second end of the shaft member, where the second cap is configured to provide the rotational force to a second mechanical component.

In some embodiments, the plurality of lobes comprises three symmetric lobes. In various embodiments, a direction of the spiral geometry is in the direction of the torsional load generated in response to the rotational force. According to some embodiments, the plurality of lobes is mechanically coupled to the inner surface, and each lobe of the plurality of lobes extends radially from the central coupling. In various embodiments, the first cap and the second cap are configured to seat the internal volume of the shaft member. In some embodiments, the first cap includes a first flange and a second flange, and the second cap includes a third flange and a fourth flange.

Also disclosed herein are methods of using an internally supported shaft capable of transferring a rotational force. The methods may include receiving a rotational force at a first end of a shaft member, receiving a torsional load at the shaft member in response to receiving the rotational force, and transmitting, using support provided by a support member, the torsional load received at the shaft member. The methods may further include transferring the rotational force to a second end of the shaft member, and providing the rotational force to a second mechanical component. In some embodiments, the plurality of lobes are coupled to each other along a central coupling and extend radially from the central coupling, and the plurality of lobes has a spiral geometry along a length of the support member such that an orientation of the plurality of lobes rotates along the length of the support member.

In some embodiments, the support member is not connected to the first cap or the second cap. Moreover, the first mechanical component may be included in a motor or engine, and the second mechanical component may be included in a tail rotor assembly of a helicopter.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Various systems, methods, and apparatus are disclosed herein that provide increased torque capability and ballistic survivability while utilizing less material and retaining a lower weight. In various embodiments, a shaft may include a support member that provides structural support to the shaft. The use of such a support member enables the shaft to be constructed with less material and a thinner shaft wall. The use of less material results in increased performance characteristics due to a lower inertia. Moreover, the support member may be configured to have a spiraled design which further increases the amount of support provided to the shaft and further decreases the overall amount of material required to make a shaft having a particular torque capability. In this way, the spiraled support member significantly decreases the amount of material required to construct the shaft, reduces the overall weight of the shaft, increases performance characteristics of the shaft, and increases ballistic survivability of the shaft.

For example, the inclusion of a support member within a shaft member as disclosed herein may result in an overall reduction of about 52% material used when compared to conventional shafts which do not have internal support features. Moreover, as will be discussed in greater detail below, the use of a spiraled geometry for support members disclosed herein may result in an overall reduction of about 40% material used when compared to conventional shafts which may include some internal support features. Accordingly, internally supported shafts as disclosed herein are significantly lighter than conventional shafts and more tolerant to damage, such as ballistic damage.

Figure 1:
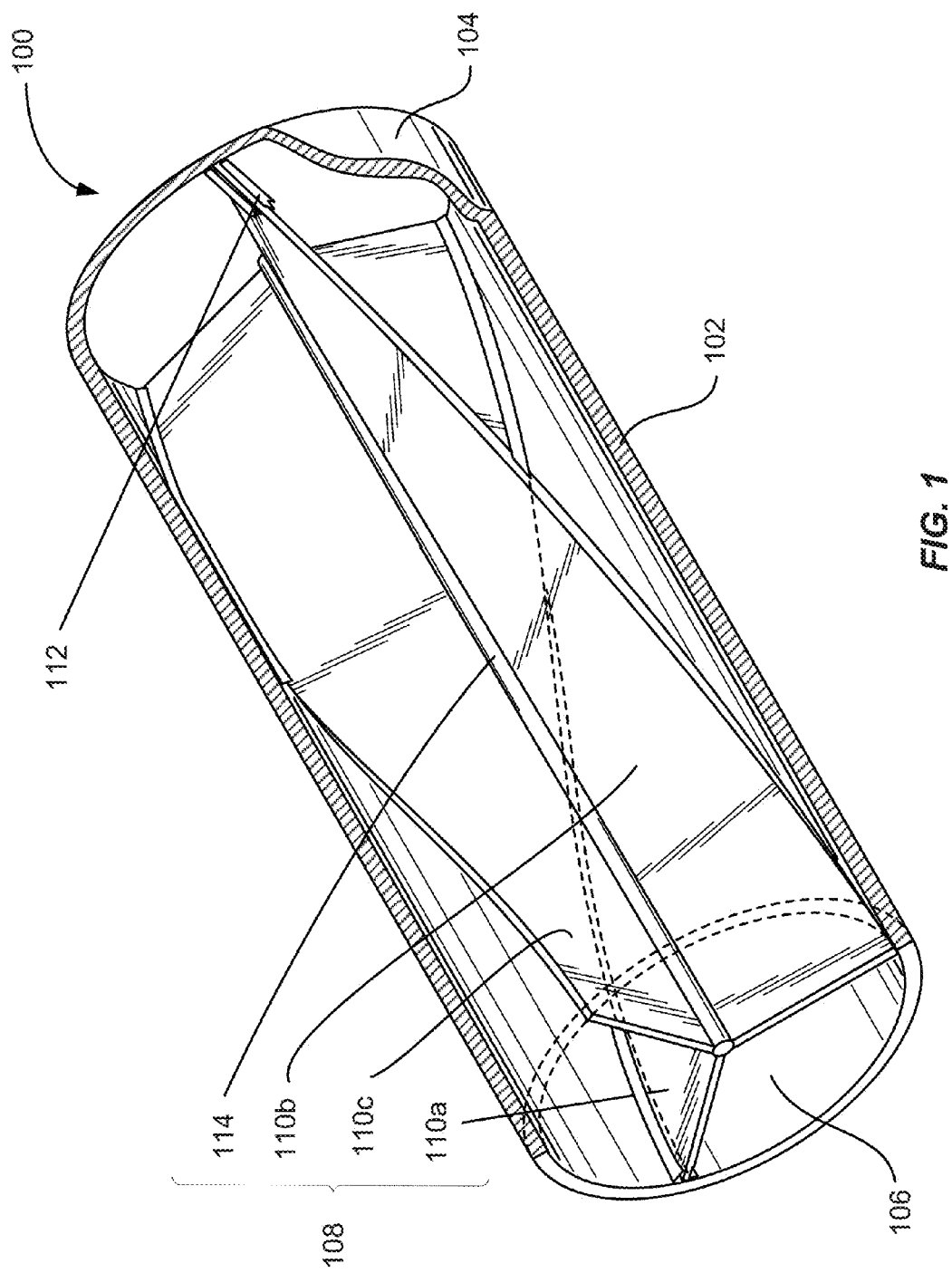
FIG. 1 illustrates an example of an internally supported shaft, implemented in accordance with some embodiments.

FIG. 1 illustrates an example of an internally supported shaft, implemented in accordance with some embodiments. Internally supported shaft 100 may include shaft member 102 which may transfer a rotational force among different parts or components of a machine or vehicle. For example, shaft member 102 may be configured to transfer a rotational force within a power train of a helicopter, and to a tail rotor assembly. In some embodiments, internally supported shaft 100 and shaft member 102 may be reinforced with support member 108. In various embodiments, support member 108 may have various physical and geometrical properties which may be configured to increase the overall torsional strength of internally supported shaft 100, thus decreasing the overall amount of material and weight required to create internally supported shaft 100, and increasing the performance characteristics, such as efficiency and durability, of internally supported shaft 100.

Internally supported shaft 100 may include shaft member 102. As shown in FIG. 1, shaft member 102 may be a cylindrical shaft that includes an outer surface and an inner surface, such as outer surface 104 and inner surface 106. Shaft member 102 may have a first end and a second end, and be configured to transfer a rotational force from the first end to the second end. In this way, a rotational force received at the first end may be transferred to the second end and provided to a mechanical component which may be coupled to the second end. In some embodiments, the application of a rotational force to the first end of shaft member 102 may apply a torque to shaft member 102 that is proportional to the applied rotational force. Thus, shaft member 102 as well as support member 108, discussed in greater detail below, may be configured to withstand a torque which may be applied and/or received during operational conditions.

In various embodiments, shaft member 102 may include a material selected to have a high ratio of tensile or torsional strength to weight. For example, shaft member 102 may include a material which may be a metal or metal alloy, such as titanium or one of its alloys, or Inconel™. Another example of a suitable material is a reinforced polymer or, more specifically, carbon fiber reinforced polymer (CFRP). In some embodiments shaft member 102 may have a thickness that is configured based on a torque that will be applied during operation. In some embodiments, the inner radius of shaft member 102 may be inner surface 106 which may define an internal volume of shaft member 102. In this example, shaft member 102 may be a substantially hollow cylinder that bounds the internal volume.

Internally supported shaft 100 may also include support member 108. In various embodiments, the torsional strength of shaft member 102 might not be sufficient to withstand the torque that will be applied to shaft member 102 during operation of the machinery or vehicle in which shaft member 102 is installed. Accordingly, internally supported shaft 100 may further include support member 108 to provide additional torsional strength to shaft member 102 and internally supported shaft 100. In various embodiments, support member 108 may be included within the internal volume bounded or defined by inner surface 106. Accordingly, support member 108 may have a length and outer radius that are smaller or less than a length and inner radius of shaft member 102. In this way, support member 108 may be contained entirely within shaft member 102.

In various embodiments, support member 108 may include one or more structural members which may be configured to transmit the torque which may be applied to shaft member 102. For example, support member 108 may include a plurality of planar structures which may be lobes, such first lobe 110a, second lobe 110b, and third lobe 110c. In this example, the planar structures may run the length of support member 108 and may radiate out from a center of support member 108 to inner surface 106, thus reinforcing inner surface 106 and shaft member 102. In this way, the tensile and torsional strength of support member 108 may provide resistance to and transmit a torque applied to shaft member 102.

In some embodiments, support member 108 includes two or more lobes which may be joined at a center of support member 108 and may radiate out from the center of support member 108. In one example, support member 108 includes three symmetric lobes. In some embodiments, support member 108 may include a material that has a high strength to weight ratio, such as titanium, a titanium alloy, Inconel™, or carbon fiber reinforced polymer. Other suitable materials include aluminum, steel, and plastics. The selection of the material depends on the application or, more specifically, on the weight requirements, torque transfer requirements, and other conditions.

In various embodiments, the lobes of support member 108, such as first lobe 110a, second lobe 110b, and third lobe 110c, may be coupled with each other via central coupling 114 which may be mechanically coupled with each of the lobes. Accordingly, central coupling 114 may provide additional mechanical coupling between first lobe 110a, second lobe 110b, and third lobe 110c, and may facilitate the transfer of rotational forces along support member 108 and shaft member 102. In some embodiments, central coupling 114 may be a rigid structure, such as a rod, to which first lobe 110a, second lobe 110b, and third lobe 110c are coupled. Accordingly, first lobe 110a, second lobe 110b, and third lobe 110c may be mechanically coupled with central coupling 114 by any suitable joining technique such as welding, brazing, or soldering. Moreover, central coupling 114 may be made of any suitable material such as a metal or a composite. In various embodiments, central coupling 114 may be formed by a bonding, welding, soldering, or brazing process applied to an intersection or abutting edge of first lobe 110a, second lobe 110b, and third lobe 110c. Accordingly, central coupling 114 may be formed by any suitable joining technique applied to first lobe 110a, second lobe 110b, and third lobe 110c.

Furthermore, in addition to tensile and torsional strength properties, support member 108 may be configured to have one or more structural or geometrical properties that provide additional torsional strength to shaft member 102 and internally supported shaft 100. In some embodiments, support member 108 may be configured to have a spiraled geometry. As shown in FIG. 1 and additionally in FIG. 2, an orientation of the lobes at a given point along shaft member 102 may change along the length of shaft member 102 and support member 108. For example, the orientation of the lobes with respect to shaft member 102 may rotate in a particular direction along the length of support member 108 such that the lobes included in support member 108 have a spiraled geometry. Such a spiraled geometry provides additional torsional support for shaft member 102 and increases the torque capacity of shaft member 102 as well as internally supported shaft 100. In some embodiments, a direction of rotation of the spiral geometry of the lobes included in support member 108 is in a direction of a torque that is generated or received in response to the rotational force applied to shaft member 102.

For example, the first end of shaft member 102 may be coupled to a mechanical component which applies a rotational force to shaft member 102 in a first rotational direction. In this example, the orientation of the spiraled lobes included in support member 108 may rotate in a second rotational direction that is in the direction of the torque that results from the rotational force. Thus, the direction and degree of rotation of the geometry of the lobes may be configured based on the operational conditions in which internally supported shaft 100 will be used. In some embodiments, an amount of rotation of the spiral geometry may be determined based on one or more design parameters and operational conditions associated with internally supported shaft 100. For example, an amount rotation of the geometry may be determined based on an inner diameter of shaft member 102, a length of shaft member 102, a thickness of shaft member 102, and a magnitude of the rotational force.

Interface 112 may be a chemical or mechanical interface configured to provide coupling between shaft member 102 and support member 108. In one example, shaft member 102 may be bonded to support member 108. In this example, interface 112 may be a bonding region formed by a chemical and/or thermal bond between shaft member 102 and support member 108 that provides mechanical coupling between shaft member 102 and support member 108. As discussed in greater detail below with reference to FIG. 3, interface 112 may also be formed by a curing process or a compression fit process. Furthermore, according to some embodiments, internally supported shaft 100 does not include interface 112. For example, shaft member 102 and support member 108 may be integrated in a single component as part of an additive manufacturing process. In this example, shaft member 102 and support member 108 are both part of the same piece of material, and no interface is required. When configured in any of the embodiments described herein, internally supported shaft 100 may have a very high torque capability.

Figure 2:
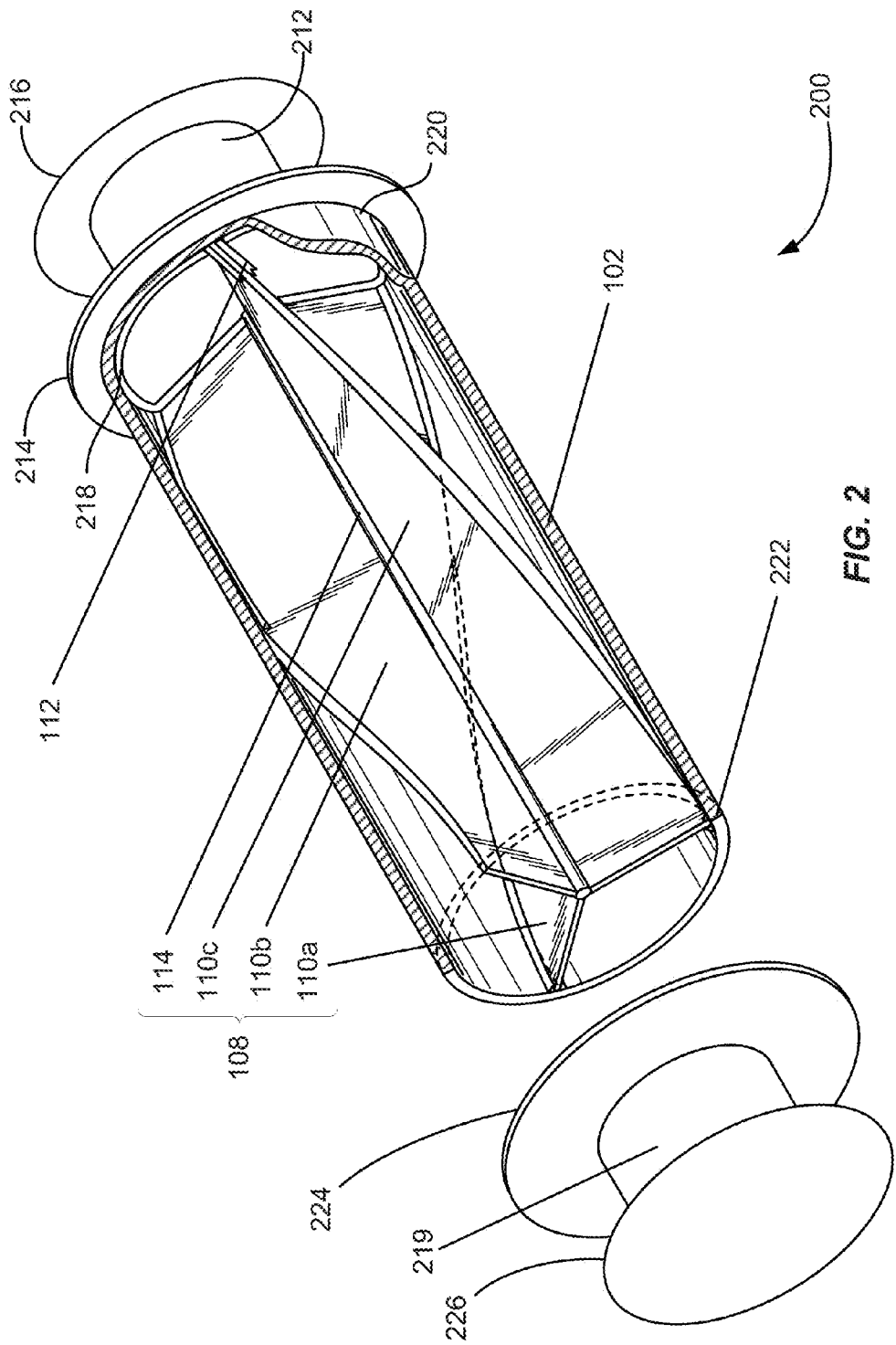
FIG. 2 illustrates another example of an internally supported shaft, implemented in accordance with some embodiments.

FIG. 2 illustrates another example of an internally supported shaft, implemented in accordance with some embodiments. As shown in FIG. 2, an internal volume of a shaft member, such as shaft member 102, may be sealed with one or more caps, such as first cap 212. Thus, a cap may be used to seal and protect internal components of internally supported shaft 200, such as support member 108, as well as provide one or more portions of internally supported shaft 200 that are configured to be coupled to other mechanical components within a vehicle or machine. For example, a first end, such as first end 220, of shaft member 102 may be coupled to first cap 212, and a second end, such as second end 222, of shaft member 102 may be coupled to a second cap, such as second cap 219. First cap 212 may be coupled to a first mechanical component and may receive a rotational force from the first mechanical component. Shaft member 102 may transfer the rotational force to second cap 219 while being reinforced by support member 108. The rotational force may then be provided to a second mechanical component coupled to second cap 219.

As similarly discussed above with reference to FIG. 1, internally supported shaft 100 may include shaft member 102 and support member 108. As shown in FIG. 2, support member 108 may include three symmetric lobes, such as first lobe 110a, second lobe 110b, and third lobe 110c. The lobes may have a spiraled geometry that rotates or advances in a particular rotational direction to provide additional torsional strength to shaft member 102 and internally supported shaft 100. In various embodiments, support member 108 may have a length that is substantially equal to or longer than shaft member 102. Accordingly, support member 108 may be coupled or connected to a cap such as first cap 212, for anchoring or stability purposes. In some embodiments, support member 108 may have a length that is slightly less than the length of shaft member 102. Thus, support member 108 may terminate prior to the end of shaft member 102 and interface 218 which may be used to couple shaft member 102 to first cap 212. Accordingly, support member 108 might not be coupled or connected to first cap 212 and/or a second cap, such as second cap 219.

As similarly discussed above, shaft member 102 may be coupled to one or more caps which may be used to seal an internal volume of shaft member 102. For example, shaft member 102 may be coupled to first cap 212. As shown in FIG. 2, shaft member 102 is coupled to first cap 12 at first end 220. First cap 12 may be configured to couple with one or more other mechanical components of a vehicle or machine. For example, first cap 212 may include first flange 214 and second flange 216 which may be separated by a groove and may be configured to couple with an opposing flange, ridge, or belt of a mechanical component of a machine or vehicle, such as a motor or a tail rotor assembly. In various embodiments, interface 218 may couple first cap 212 to shaft member 102. In some embodiments, interface 218 may be formed by a bonding process which may create a chemical and/or thermal bond. In this way, interface 218 may transfer a rotational force between shaft member 102 and first cap 212, which may also transfer rotational forces with the appropriate mechanical component of the vehicle or machine.

Furthermore, the other end of shaft member 102, such as second end 222, may be coupled to another cap which may be coupled to another mechanical component of the machine or vehicle. Accordingly, shaft member 102 may be coupled to second cap 219, which may also include flanges such as third flange 224 and fourth flange 226. As similarly discussed above, an interface similar to interface 218 may couple second cap 219 to shaft member 102, and may be configured to transfer a rotational force between shaft member 102 and second cap 219, which may then transfer the rotational force to or from an appropriate mechanical component of the vehicle or machine. In one example, a power plant or motor may be coupled to first cap 212, may apply a rotational force to first cap 212 which may then be transferred to shaft member 102 and support member 108, and further transferred to second cap 219 and a mechanical component, such as a tail rotor assembly, coupled to second cap 219. It will be appreciated that FIG. 2 illustrates an exploded-view of second cap 219 and shaft member 102 to facilitate the illustration of shaft member 102 and its internal components. As discussed above, when implemented in accordance with various embodiments, second cap 219 is coupled with shaft member 102 as similarly shown and described for first cap 212.

Figure 3A:
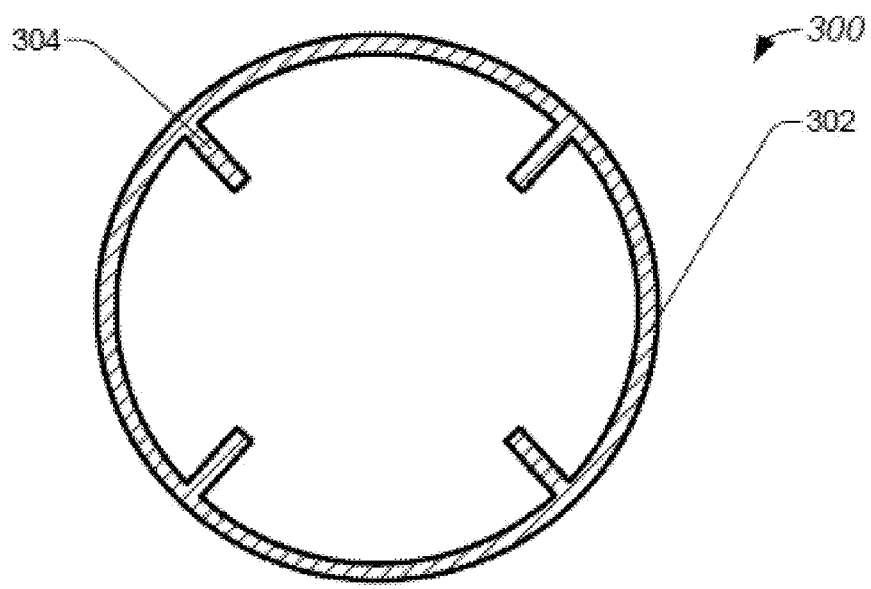
FIG. 3A illustrates yet another example of an internally supported shaft, implemented in accordance with some embodiments.

FIG. 3A illustrates yet another example of an internally supported shaft, implemented in accordance with some embodiments. As shown in FIG. 3A, one or more lobes of a support member included in shaft 302 of internally supported shaft 300 may be directly connected to or mounted upon an internal surface of shaft 302. For example, lobe 304 may be directly coupled or connected to an internal surface of shaft 302, and may be configured to have a width or radius that is substantially less than an internal radius of shaft 302. In this example, internally supported shaft 300 is supported by a support member that may include a plurality of lobes, such as lobe 304, as discussed above with reference to internally supported shaft 100 of FIG. 1 and internally supported shaft 200 of FIG. 2. However, because the lobes are mounted to the interior surface of shaft 302 and have a radius or width that is substantially less than a radius of shaft 302, the center of shaft 302 is substantially hollow and not occupied by any of the lobes included in the support member, such as lobe 304. Because the center is substantially hollow, the overall weight of internally supported shaft 300 may be reduced thus resulting in a lighter internally supported shaft.

Figure 3B:
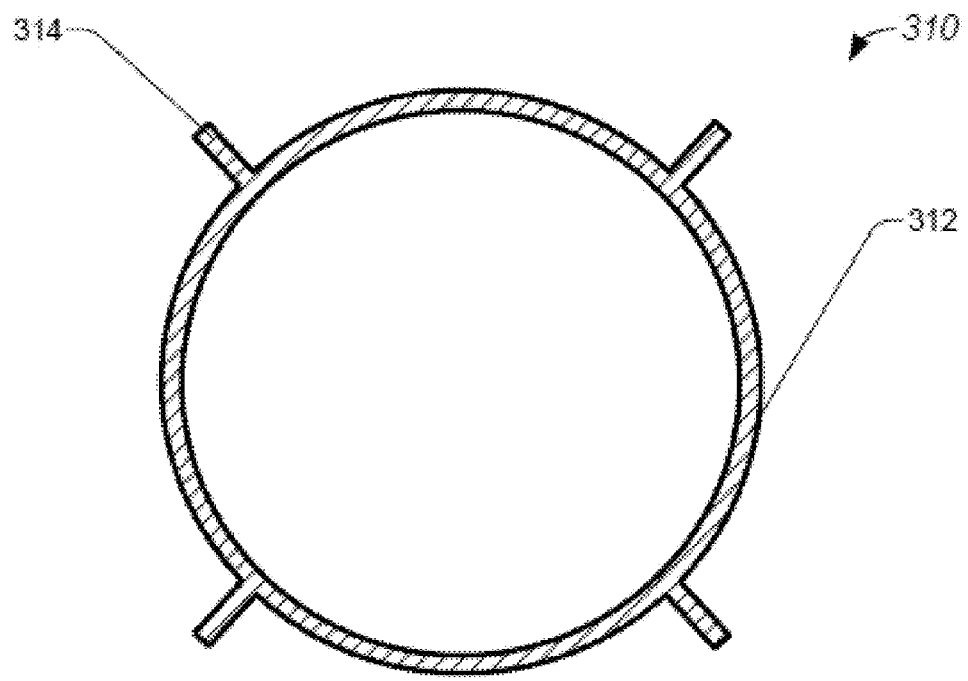
FIG. 3B illustrates an example of an externally supported shaft, implemented in accordance with some embodiments.
Figure 3C:
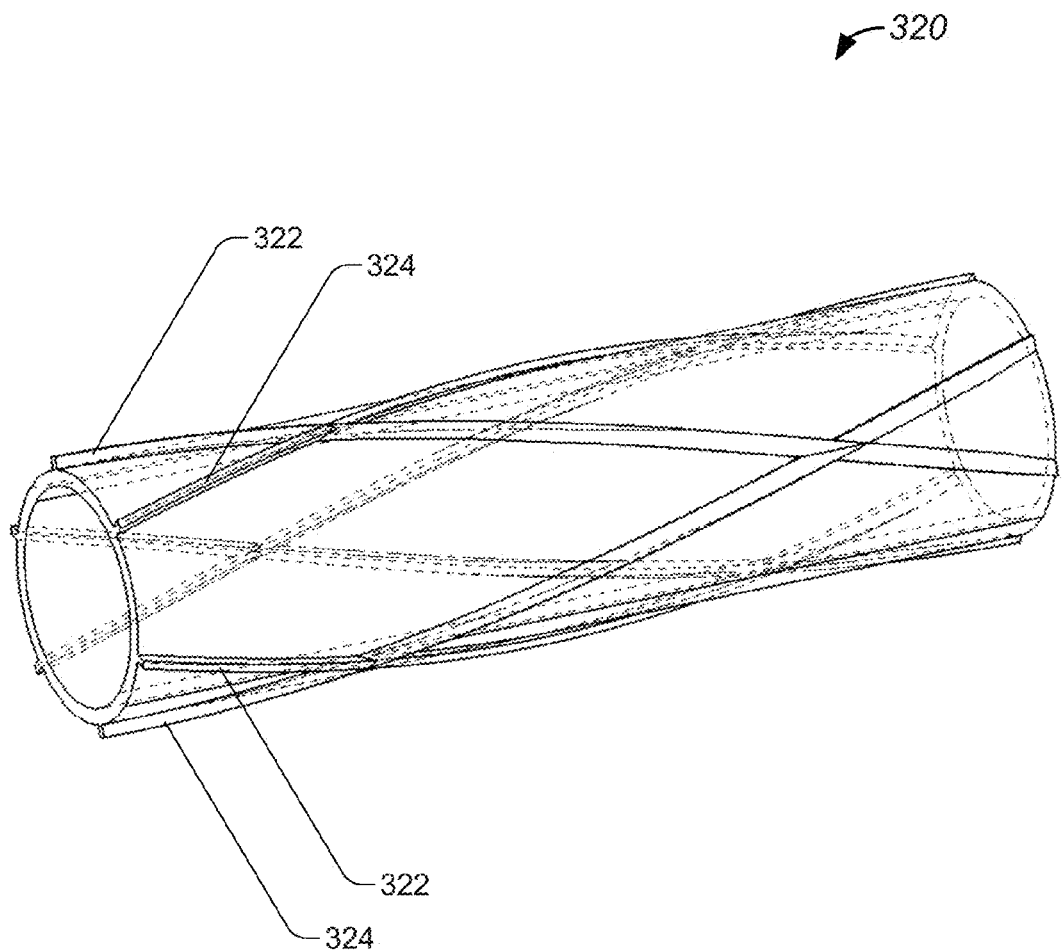
FIG. 3C is a schematic illustration of a shaft having two sets of lobes spiraled in opposite directions to provide support in two different torsional directions during rotation of the shaft in accordance with some embodiments.

FIG. 3B illustrates an example of an externally supported shaft, implemented in accordance with some embodiments. As shown in FIG. 3B, one or more lobes of a support member included in shaft 312 of externally supported shaft 310 may be directly connected to or mounted upon an external surface of shaft 312. In this example, a support member may include a plurality of lobes, such as lobe 314, which may be mounted to an external surface of shaft 312. An externally supported shaft (e.g., shaft 310 in FIG. 3B) may be supported or reinforced by a spiral geometry of one or more lobes of a support member (e.g., lobe 314). Examples of the spiral geometry are shown in FIGS. 2 and 3C. Specifically, the support member may include multiple lobes (e.g., four lobes as, for example, shown in FIG. 3B or six lobes, as for example, shown in FIG. 3C), which may be spiraled along the exterior surface of the shaft. As similarly discussed above with reference to FIG. 3A, the width or radius of a lobe, such as lobe 314 shown in FIG. 3B, may be substantially less than a radius of shaft 312. When configured in this way, shaft 312 may be substantially hollow, and an overall weight of externally supported shaft 310 may be reduced.

In some embodiments, the support members of internally supported shaft 300 and externally supported shaft 310 may be implemented within the same supported shaft. Thus, a shaft member may be supported by lobes of support members mounted both internally and externally. For example, a shaft may include a first plurality of lobes which may be coupled to or mounted on an internal surface of the shaft, such as lobe 304. The shaft may further include a second plurality of lobes coupled to or mounted on an external surface of the same shaft, such as lobe 314. In this way, a shaft may be supported by both internal and external lobes. Moreover, the directions of the spiral geometry of the first and second plurality of lobes may be the same, or they may be different. For example, the first plurality of lobes and the second plurality of lobes may be spiraled in the same direction to provide additional support in a single torsional direction. In another example shown in FIG. 3C, a shaft 320 has a first plurality of lobes 322 that spiral in a first direction and a second plurality of lobes 324 that spiral in a second direction to provide support in two different torsional directions.

Figure 4:
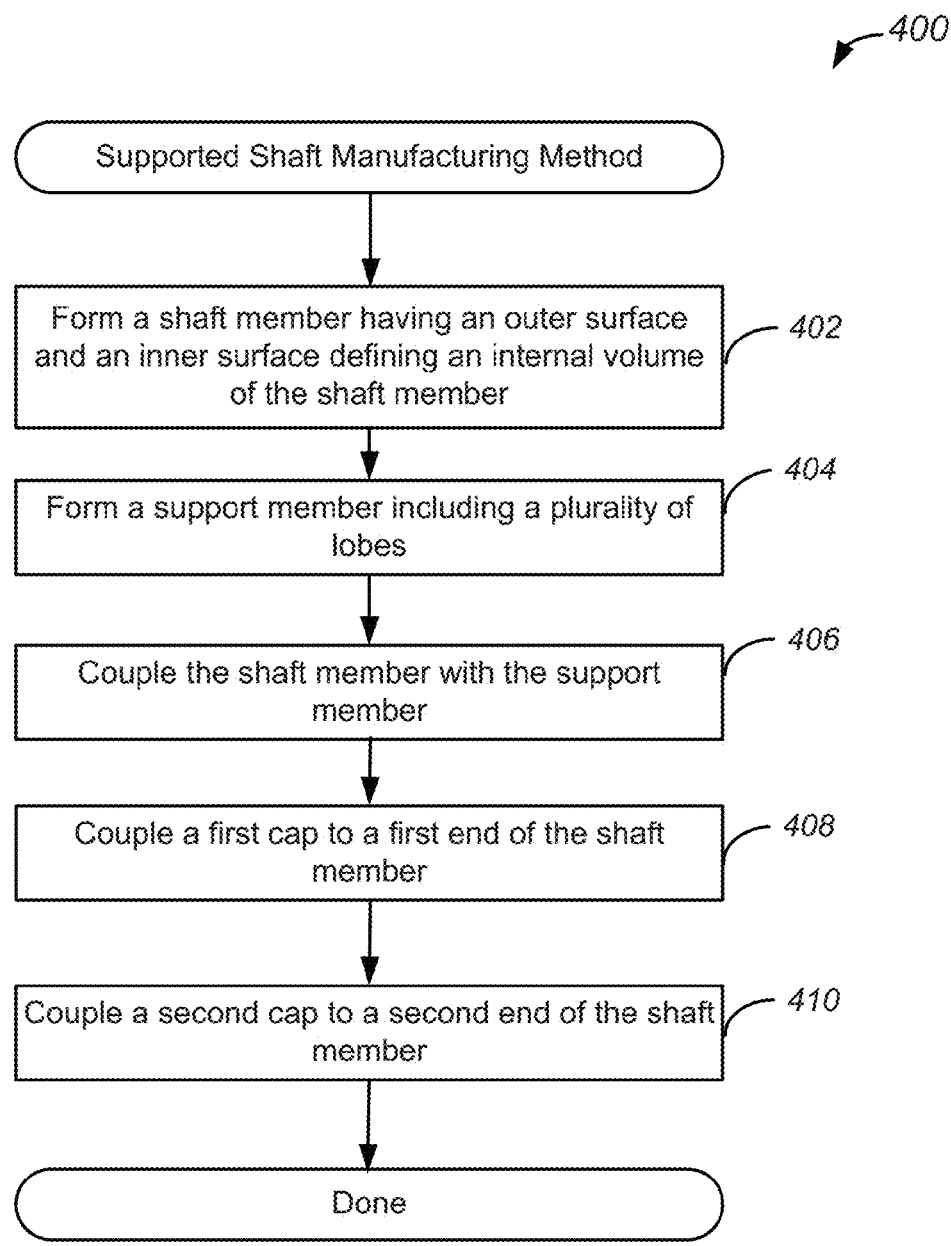
FIG. 4 illustrates a flow chart of an example of a method for manufacturing a supported shaft, implemented in accordance with some embodiments.

FIG. 4 illustrates a flow chart of an example of a method for manufacturing a supported shaft, implemented in accordance with some embodiments. In various embodiments, manufacturing method 400 may be used to create or form a supported shaft that includes or is coupled to a support member. As similarly discussed above, the supported shaft may include a first cap and a second cap that seal an internal volume of the supported shaft. As will be described in greater detail below, various manufacturing and processing techniques may be used to form the components of the supported shaft as well as couple them together.

Accordingly, manufacturing method 400 may commence with operation 402, during which a shaft member having an outer surface and an inner surface may be formed. In some embodiments, the shaft member may be made of a metal material and may be formed using a process such as extrusion, forging, rolling, or spinning. In various embodiments, the shaft member may include a composite material which may be made by spraying and layering one or more materials. It will be appreciated that manufacturing method 400 may optionally include operation 402 and that, according to some embodiments, the shaft member is pre-fabricated. As previously discussed, the inner surface of the shaft member may define and bound an internal volume of the shaft member.

Manufacturing method 400 may proceed with operation 404, during which a support member may be formed. As previously discussed, the support member may include multiple lobes and may have a spiral geometry. According to various embodiments, the support member may be made of a metal material and may be formed using a process such as extrusion or forging. Moreover, in some embodiments, the support member may include a composite material which may be made by spraying and layering one or more materials. In some embodiments, the support member may be made using an additive manufacturing or 3D printing process in which successive layers of material are deposited to form the support member, in some embodiments, operation 404 may include forming a central coupling, which may be a rod, and attaching or coupling the lobes to the central coupling through any suitable joining technique. In various embodiments, the central coupling may be formed by a joining process applied to the lobes.

Manufacturing method 400 may proceed with operation 406, during which the shaft member may be coupled with the support member. In various embodiments, the shaft member may be coupled to the support member by using a compression fit process in which the shaft member is heated and expanded, the support member is placed within the internal volume of the shaft member, and the shaft member cools and tightens on the support member. According to various embodiments, the shaft member may be coupled to the support member by using a bonding process in which a chemical and/or thermal bond is formed between the shaft member and the support member by use of an adhesive or a brazing process. In some embodiments, the shaft member may be coupled to the support member by using a co-curing or co-bonding process.

In some embodiments, manufacturing method 400 may optionally perform operation 406. Thus, the support member might not be bound to the shaft member. Moreover, in some embodiments, the shaft member and support member may be integrated as a single component. Thus, operation 402 and 404 may be part of a continuous manufacturing process in which the shaft member and support member are formed simultaneously and as part of the same component. For example, an additive manufacturing process may be used to form both the shaft member and support member at the same time and as part of the same component. In this example, because the shaft member and support member have been formed simultaneously and are integrated as one component, operation 406 might not be performed because no additional coupling is necessary.

Manufacturing method 400 may proceed with operation 408, during which a first cap may be coupled to a first end of the shaft member. In some embodiments the first cap may be a pre-fabricated cap that may be coupled to a first end of the shaft member using any of the coupling processes described above, such as a compression fit or bonding process. Moreover, manufacturing method 400 may proceed with operation 410, during which a second cap may be coupled to a second end of the shaft member. As similarly discussed above with reference to operation 408, the second cap may be a pre-fabricated cap that may be coupled to a second end of the shaft member using any of the coupling processes described above, such as a compression fit or bonding process.

Figure 5:
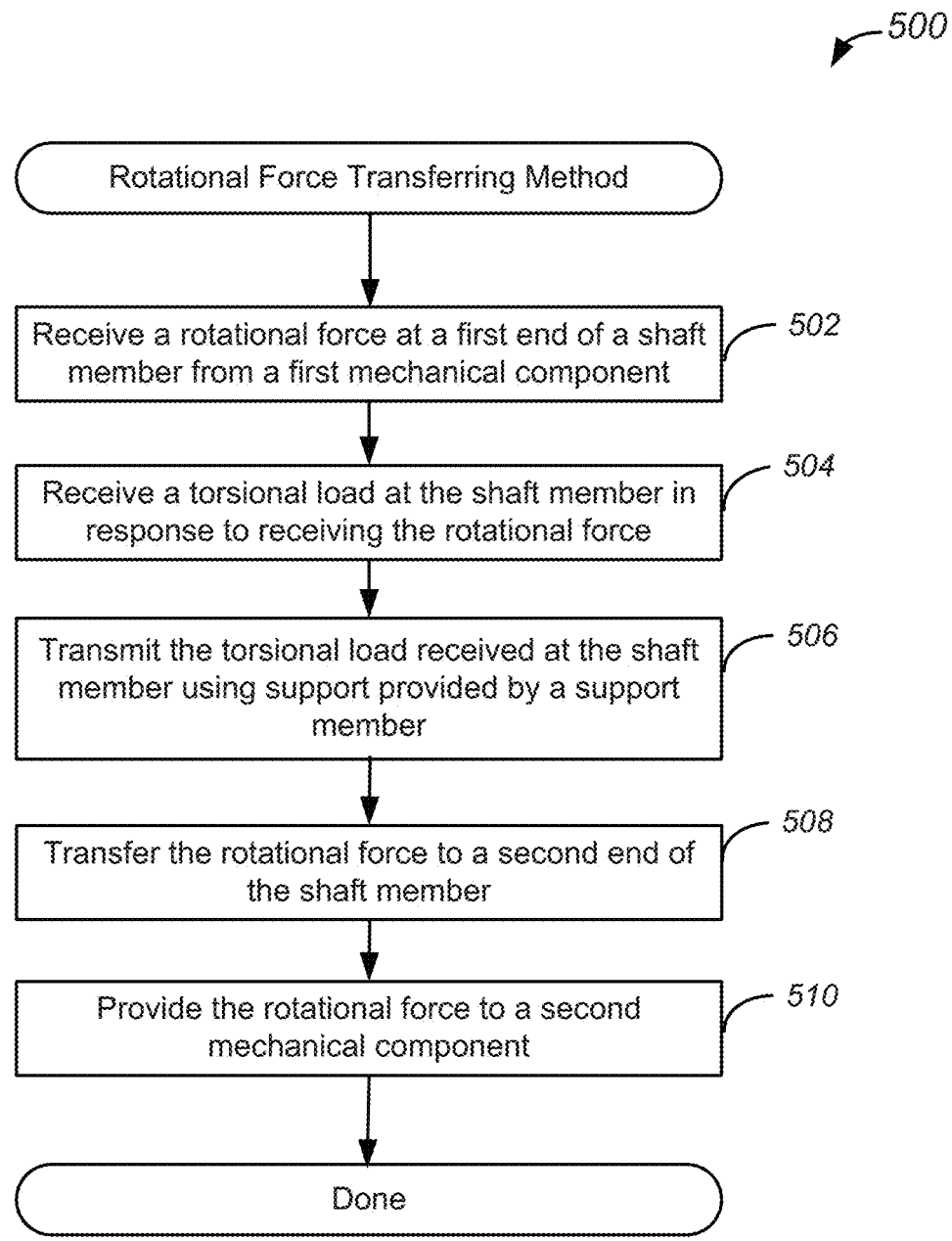
FIG. 5 illustrates a flow chart of an example of a method for using a supported shaft to transfer a rotational force, implemented in accordance with some embodiments.

FIG. 5 illustrates a flow chart of an example of a method for using a supported shaft to transfer a rotational force, implemented in accordance with some embodiments. Accordingly, rotational force transferring method 500 illustrates an example of a method that may be used to transfer a rotational force during operation of a vehicle or machine, such as a helicopter. Such rotational forces may be generated by a power plant and transferred to various other components of a drive train to facilitate the operation of one or more mechanical components which may be used to power or move the vehicle or machine.

Accordingly, rotational force transferring method 500 may commence with operation 502, during which a rotational force may be received at a first end of a shaft member from a first mechanical component. As similarly discussed above, the first mechanical component may be a component associated with or included in a power plant of a vehicle or machine, such as the engine of a helicopter. In some embodiments, the first mechanical component may be mechanically coupled to the first end of the shaft member and may transfer at least some of a rotational force generated by the power plant to the first end of the shaft member.

Rotational force transferring method 500 may proceed with operation 504, during which a torque may be received at the shaft member in response to receiving the rotational force. Accordingly, in response to receiving the rotational force at the first end of the shaft member, the supported shaft may experience torsion in the form of a torque which may be directly proportional to the amount of rotational force received.

Rotational force transferring method 500 may proceed with operation 506, during which the torque may be transmitted using support provided by a support member. As similarly discussed above, the support member included within the shaft member may be coupled to the shaft member to provide additional support and torsional strength and rigidity to the shaft member. Moreover, the support member may have a spiraled geometry that is configured based on the dimensions and operational conditions of the shaft member. During operation 506, the physical and geometrical properties of the support member may transmit the torque placed on the shaft member, and provide the shaft member with sufficient torsional strength and rigidity to withstand the torque. In the absence of such additional support and reinforcement, the shaft member would likely fail, collapse upon itself, and cease to operate properly. In this way, the support member enables the shaft member and supported shaft to withstand torques experienced during operational conditions, and further enables the transferring of rotational forces from the first end to the second end of the shaft member.

Accordingly, rotational force transferring method 500 may proceed with operation 508, during which the rotational force may be transferred to a second end of the shaft member. A similarly discussed above, due to a torsional rigidity of the shaft member and the support provided by the support member, the rotational force may be transferred from the first end of the shaft member to the second end of the shaft member. Subsequently, during operation 510, the rotational force may be provided to a second mechanical component. As similarly discussed above, the second mechanical component may be a component of a vehicle or machine, such as a tail rotor assembly of a helicopter. The second mechanical component may be mechanically coupled to the second end of the shaft member. In some embodiments, the second end may transfer the rotational force to the second mechanical component. For example, the rotational force may be provided to the tail rotor assembly and used to rotate or turn the tail rotor.

Figure 6:
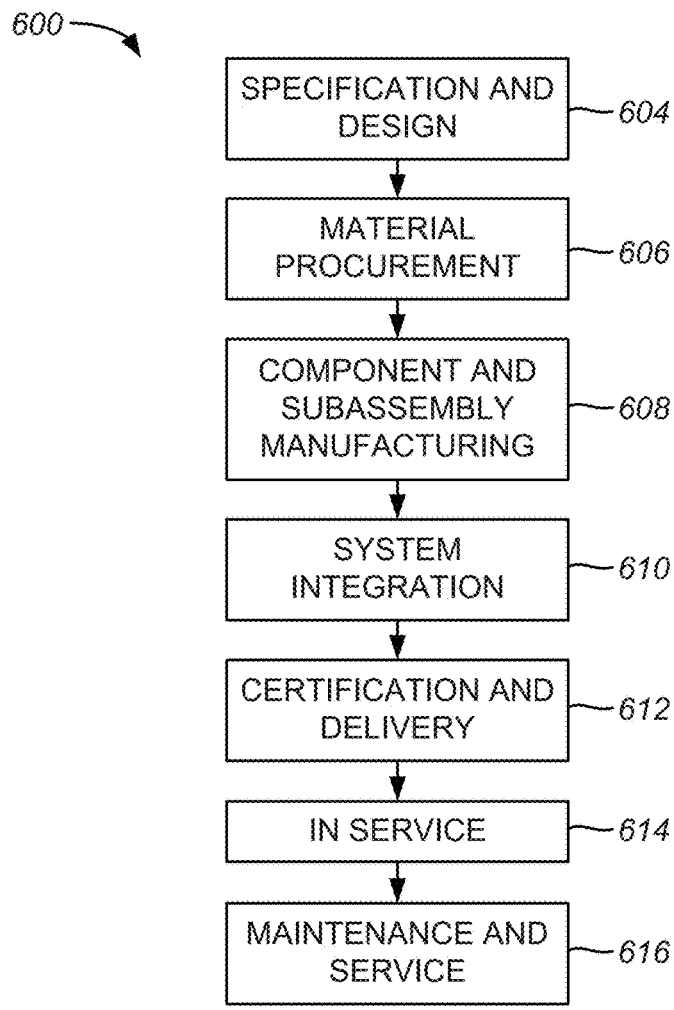
FIG. 6 illustrates a flow chart of an example of an aircraft production and service methodology, in accordance with some embodiments.
Figure 7:
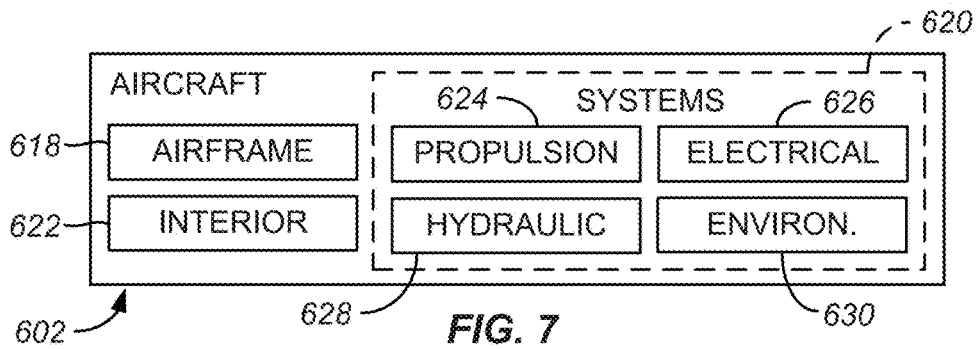
FIG. 7 illustrates a block diagram of an example of an aircraft, in accordance with some embodiments.

In addition to the previously described manufacturing methods, embodiments of the disclosure may be described in the context of an aircraft manufacturing and service method 600 as shown in FIG. 6 and an aircraft 602 as shown in FIG. 7. During pre-production, illustrative method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by illustrative method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the disclosure may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more apparatus embodiments, method embodiments, or a combination thereof may be utilized while the aircraft 602 is in service, for example and without limitation, to maintenance and service 616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An apparatus for transferring a rotational force, the apparatus comprising:
   a shaft member comprising:
      a first end of the shaft member configured to receive the rotational force from a first mechanical component, wherein the shaft member is configured to receive a torsional load in response to receiving the rotational force at the first end,
      a second end of the shaft member configured to provide the rotational force to a second mechanical component,
      an outer surface, and
      an inner surface, wherein the inner surface defines an internal volume of the shaft member; and
   a support member included in the internal volume of the shaft member, the support member comprising a plurality of lobes coupled to the shaft member and configured to transmit the torsional load of the shaft member, wherein the plurality of lobes are coupled to each other along a central coupling and extend radially from the central coupling, wherein the central coupling is formed by a bond between the plurality of lobes, wherein the plurality of lobes has a spiral geometry along a length of the support member such that an orientation of the plurality of lobes rotates along the length of the support member.

2. The apparatus of claim 1, wherein the plurality of lobes comprises three lobes.

3. The apparatus of claim 2, wherein the three lobes are symmetric lobes.

4. The apparatus of claim 1, wherein a direction of the spiral geometry is in the direction of the torsional load generated in response to the rotational force.

5. The apparatus of claim 1, wherein the length of the support member is substantially equal to a length of the shaft member.

6. The apparatus of claim 1, wherein the plurality of lobes is mechanically coupled to the inner surface, and wherein each lobe of the plurality of lobes extends radially from the central coupling.

7. The apparatus of claim 1, wherein the first end is coupled to a first cap, and wherein the second end is coupled to a second cap.

8. The apparatus of claim 7, wherein the first cap and the second cap are configured to seal the internal volume of the shaft member.

9. The apparatus of claim 7, wherein the first cap comprises a first flange and a second flange, and wherein the second cap comprises a third flange and a fourth flange.

10. The apparatus of claim 1, wherein the support member includes at least one of titanium, a composite material, and a polymer.

11. The apparatus of claim 1, wherein the support member is coupled to the shaft member by a bonding process selected from a group consisting of: a welding process, a brazing process, and a soldering process.

12. A system for transferring a rotational force, the system comprising:
a first cap configured to receive the rotational force from a first mechanical component;
a shaft member coupled to the first cap, the shaft member comprising:
a first end configured to receive the rotational force from the first cap mechanically coupled with the first mechanical component, wherein the shaft member is configured to receive a torsional load in response to receiving the rotational force at the first end,
a second end opposite to the first end,
an outer surface, and
an inner surface, wherein the inner surface defines an internal volume of the shaft member;
a support member included in the internal volume of the shaft member, the support member comprising a plurality of lobes coupled to the shaft member and configured to transmit the torsional load of the shaft member, wherein the plurality of lobes are coupled to each other along a central coupling and extend radially from the central coupling, wherein the central coupling is formed by a bond between the plurality of lobes, wherein the plurality of lobes has a spiral geometry along a length of the support member such that an orientation of the plurality of lobes rotates along the length of the support member; and
a second cap coupled to the second end of the shaft member, wherein the second cap is configured to provide the rotational force to a second mechanical component.

13. The system of claim 12, wherein the plurality of lobes comprises three symmetric lobes.

14. The system of claim 12, wherein a direction of the spiral geometry is in a direction of the torsional load generated in response to the rotational force.

15. The system of claim 12, wherein the plurality of lobes is mechanically coupled to the inner surface, and wherein each lobe of the plurality of lobes extends radially from the central coupling.

16. The system of claim 12, wherein the first cap and the second cap are configured to seal the internal volume of the shaft member.

17. The system of claim 12, wherein the first cap comprises a first flange and a second flange, and wherein the second cap comprises a third flange and a fourth flange.

18. A method of using an internally supported shaft capable of transferring a rotational force, the method comprising:
receiving, from a first mechanical component, the rotational force at a first end of a shaft member, wherein the shaft member has an outer surface and an inner surface, and wherein the inner surface defines an internal volume of the shaft member;
receiving a torsional load at the shaft member in response to receiving the rotational force;
transmitting, using support provided by a support member included in the internal volume of the shaft member, the torsional load received at the shaft member, wherein the support member comprises a plurality of lobes coupled to the shaft member and configured to transmit the torsional load of the shaft member, wherein the plurality of lobes are coupled to each other along a central coupling and extend radially from the central coupling, wherein the central coupling is formed by a bond between the plurality of lobes, and wherein the plurality of lobes has a spiral geometry along a length of the support member such that an orientation of the plurality of lobes rotates along the length of the support member;
transferring the rotational force to a second end of the shaft member; and
providing the rotational force to a second mechanical component.

19. The method of claim 18, wherein the first end is coupled to a first cap, and wherein the second end is coupled to a second cap.

* * * * *